United States Patent
Mahnad et al.

(10) Patent No.: US 8,790,561 B2
(45) Date of Patent: Jul. 29, 2014

(54) METHODS FOR MANUFACTURING AN EMBOSSER DRUM FOR USE IN PRE-FORMATTING OPTICAL TAPE MEDIA

(75) Inventors: Faramarz Mahnad, Brookline, MA (US); Joseph J. Kozak, Belchertown, MA (US)

(73) Assignee: Oracle International Corporation, Redwood City, CA (US)

(*) Notice: Subject to any disclaimer, the term of this patent is extended or adjusted under 35 U.S.C. 154(b) by 251 days.

(21) Appl. No.: 13/184,844

(22) Filed: Jul. 18, 2011

(65) Prior Publication Data

US 2013/0019766 A1    Jan. 24, 2013

(51) Int. Cl.
*B29C 33/42*     (2006.01)
*B29C 59/02*     (2006.01)
*B29C 59/04*     (2006.01)

(52) U.S. Cl.
CPC .............. *B29C 59/02* (2013.01); *B29C 59/046* (2013.01); *B29C 2059/023* (2013.01); *B29C 59/04* (2013.01)
USPC ........... 264/219; 264/310; 264/465; 425/373; 425/396; 425/471

(58) Field of Classification Search
USPC .......... 264/310, 219, 485; 425/373, 393–396, 425/471
See application file for complete search history.

(56) References Cited

U.S. PATENT DOCUMENTS

| | | | |
|---|---|---|---|
| 3,416,466 A | 12/1968 | Weidenmiller | |
| 5,310,333 A | 5/1994 | Sato et al. | |
| 5,524,105 A | 6/1996 | Brewen et al. | |
| 6,716,017 B2 | 4/2004 | Papadopoulas | |
| 7,369,483 B2 | 5/2008 | Slafer et al. | |
| 7,674,103 B2 | 3/2010 | Slafer | |
| 7,833,389 B1 | 11/2010 | Slafer | |
| 8,387,255 B2* | 3/2013 | Ogino et al. | 29/895.212 |
| 2007/0126148 A1* | 6/2007 | Coyle et al. | 264/299 |
| 2007/0222096 A1 | 9/2007 | Slafer | |
| 2007/0245836 A1* | 10/2007 | Vaganov | 73/862.621 |
| 2008/0106001 A1* | 5/2008 | Slafer | 264/310 |
| 2008/0299247 A1* | 12/2008 | Ogino et al. | 425/471 |
| 2010/0136151 A1 | 6/2010 | Mahnad et al. | |
| 2012/0152888 A1* | 6/2012 | Jeong et al. | 216/11 |

OTHER PUBLICATIONS

Velten, Thomas, et al., "Roll-to-Roll Hot Embossing of Microstructures," May 5-7, 2010, Seville, Spain, EDA Publishing/DTIP 2010, ISBN: 978-2-35500-011-9.

* cited by examiner

*Primary Examiner* — Joseph S Del Sole
*Assistant Examiner* — Nahida Sultana
(74) *Attorney, Agent, or Firm* — Marsh Fischmann & Breyfogle LLP; Jonathon A. Szumny; Kent A. Lembke

(57) ABSTRACT

Various embodiments herein include utilities for generating embosser drums that are used to pre-format optical media such as optical tape with a pattern of nanostructures such as wobbled grooves. One utility includes generating a plurality of replicas from an embossing master and bonding the replicas together to form a bonded replica structure having a surface with the nanostructure pattern imprinted therein and a surface area that is approximately the same as an outer embossing surface of the embosser drum to be formed. Advantageously, a single, one-piece metallic shim can subsequently be generated, appropriately shaped and welded at a single seam to form the embosser drum outer embossing surface.

16 Claims, 4 Drawing Sheets

METHODS FOR MANUFACTURING AN EMBOSSER DRUM FOR USE IN PRE-FORMATTING OPTICAL TAPE MEDIA

BACKGROUND

1. Field of the Invention

The present invention generally relates to devices and processes for pre-formatting optical media such as optical tape, and more particularly to a process of producing or fabricating an embosser drum for use in performing continuous roll-to-roll nanoimprint lithography to pre-format optical tape.

2. Relevant Background

Optical tape is a type of digital storage media that is generally in the form of a long and narrow strip of plastic that is designed to wind around a number of reels and be moved in first and second opposite longitudinal directions by a drive motor (the reels and drive motor being known as a "tape transport system"). As the optical tape is moved about the reels by the drive motor, digital content (e.g., binary data in the form of a series of encoding patterns) may be written and read by one or more lasers which may be embodied in one or more optical pickup units (OPUs).

The encoded binary data may be in the form of "pits" (e.g., indentations, indicia) and "lands" (e.g., the portion of the tape between adjacent pits) disposed on one or more encoding or recording layers (e.g., each including a dye recording layer, a phase change material such as AgInSbTe, and/or a semi transparent metal reflecting layer). Pits result in decreased (e.g., distorted) reflection when read by a laser and may equate to a binary value of zero or "off" whereas lands reflect laser light and may equate to a binary value of one or "on". Generally, the smaller the indicia are on the optical media, the higher the capacity is of the optical media.

To enhance positioning, tracking, focusing, and the like in relation to the optical tape and related componentry (e.g., OPUs, hardware, control system, and/or the like), one or more physical features may be incorporated into one or more surfaces of the optical tape at the time of manufacture (i.e., the optical tape may be "pre-formatted"). For instance, nanometer scale patterns may be imprinted in the optical tape by way of mechanically deforming the tape (e.g., one or more monomer or polymer layers of the tape) and curing the tape with heat or UV light during the imprinting. One type of nanometer scale pattern may be a series of grooves defined on the surface of the optical tape. Encoded data in the form of pits and the resultant lands between adjacent pits may be formed within grooves and/or on the portion of the optical surface between adjacent grooves (which may also be referred to as "lands"). The encoding may utilize any appropriate recording process such as helical scan recording, quadruplex recording, and/or the like. In any event, forming the encoded pattern of pits and lands within and/or in relation to the grooves facilitates tracking of data by OPUs. In some arrangements, the pre-formatting may include forming "wobbled" grooves in the optical tape where the wobbled features on the edges of each groove provide addressing information in relation to the data tracks.

In relation to the pre-formatting of optical tape, "Roll-to-Roll Nanoimprint Lithography" has been proposed as a method to pre-format optical tape media with nanostructure imprints such as a series or set of generally parallel wobbled grooves. This process generally involves transporting the optical tape through a number of operational stages by way of a tape transport system (e.g., system of reels, tensions sensors, and the like). Among others, operational stages typically include coating and sputtering, embossing and curing. In relation to the embossing stage, the optical tape is typically wound around what may be referred to as an "embossing" or "embosser" drum (e.g., roller) that includes a pattern of nanostructures which serves to emboss the pattern into the surface of the optical tape.

SUMMARY

The ability of embosser drums to accurately pre-format optical tape (e.g., by way of embossing a pattern of wobbled grooves into the surface of the optical tape) depends upon a number of factors. As discussed above, an embosser drum includes a series of nanostructures that are designed to emboss a desired shape into the optical tape (where the shapes of the nanostructures are of an opposite shape from that of the embossed pattern in the optical tape). In this regard, the fidelity and robustness of the nanostructures formed in the surface of the embosser drum should be maintained to achieve an accurate series of nanometer scale patterns in the surface of the optical tape.

Furthermore, an increase in the number of metallic segments or shims used to form the nanostructured surface of the embosser drum results in a corresponding reduction in the quality and performance of the embosser drum (i.e., reduces the ability of the embosser drum to accurately reproduce the nanometer scale patterns on the surface of the optical tape). More specifically, existing embosser drum development and manufacturing generally consists of designing the layout of the nanostructures to be formed on the outer surface of the embosser drum, producing a quartz or silicon embossing "master" that is etched with the nanostructure layout, creating a plurality of rigid polymeric replicas of the master's patterns, performing a metal plating process (e.g., electroforming) on the surface patterns of each of the replicas to generate thin metal "stamper" plates or shims including the nanostructure patterns, shaping each of the shims to form a plurality of cylinder segments, welding the segments together to form a cylindrical embossing surface of an embosser drum, and then inserting a solid cylindrical core (e.g., made of rubber) into the inside of the cylindrical embossing surface to form the embosser drum.

The master is typically designed to have a width that is the same as the width of the final embosser drum embossing surface and a length that is a particular fraction of the circumferential length of the final embosser drum embossing surface such that the plurality of metallic segments formed from the replicas can be welded together at their ends to form the embosser drum embossing surface. For instance, as existing embosser drums typically include four metallic segments that are welded together along a number of axial seams (i.e., seams that are generally perpendicular to the a longitudinal dimension of the grooves of the nanostructure pattern and generally parallel to a longitudinal or rotational axis of the embosser drum) to form the outer surface of the embosser drum, the master typically has a length that is one-quarter of the circumferential length of the final embosser drum embossing surface.

In one regard, an increase in the number of seams (regardless of seam type) between metallic segments equates to an increase in the number of welding steps that must be performed to weld the segments together. Correspondingly, an increase in the degree to which the final product of the embosser drum is at the mercy of each of the welding processes results (i.e., there is an increase in the likelihood of welding errors by a factor that is directly related to the number of segments being used). More specifically, each welding step often results in uneven seam height profiles (e.g., the top of a land or groove of the nanostructure pattern of one segment is not level with the top of a corresponding land or groove of the nanostructure pattern of an adjacent segment at the seam or weld junction), uneven footprints (e.g., the edge of a land or groove of the nanostructure pattern of one segment is not aligned with the edge of a corresponding land or groove of the nanostructure pattern of an adjacent segment at the seam or weld junction), and increased seam widths (i.e., the distance between opposing ends of adjacent cylinder segments), all of which reduce drive performance and the ability of the embosser drum to accurately form the patterns on the optical tape. Additionally, each of the various metallic segments typically must be shaped and/or formed to the shape of the surface of the embosser drum (e.g., into a portion of a cylinder) to be formed. As with the welding processes, having to shape and form each segment results in an increase in the degree to which the final product of embosser drum is at the mercy of the ability of the manufacturing process to accurate shape each of the plurality of segments by a factor directly related to the particular number of metallic segments to be used to form the embosser drum surface.

Furthermore, the use of the axial seams (e.g., as opposed to longitudinal seams) between the plurality of metallic segments presents elements of uncertainty and quality degradation into the nanometer scale patterns on the surface of the optical tape. More specifically, axial seams necessarily result in transverse weld marks being imprinted across the width of the optical tape at regular intervals equal to the length of each metallic segment. As the OPUs are required to traverse the weld marks at each interval, the OPUs are thus subject to the flaws of such seams each time the seams pass the OPUs. Moreover, welding seams in an axial manner can increase the difficulty in ensuring even height profiles and footprints.

It has been determined by the inventors that apparatuses, methods of manufacture or fabrication, and the like (i.e., utilities) in relation to embosser drums are needed that are operable to reduce or limit the aforementioned inefficiencies of existing embosser drum designs and manufacturing methods for such existing embosser drum designs. Methods of manufacture and embosser drums produced from such manufacturing methods will be disclosed including the use of at least one of a) an "embossing master" having an increased length and/or reduced width compared to previous embossing masters, b) the generation of a plurality of first generation polymer replicas which are bonded together using at least one longitudinal seam (i.e., as opposed to an axial seam) to generate a bonded first replica structure having a major surface with a desired nanostructure pattern and a surface area the same as that of an outer surface of the embosser drum to be formed, c) reduced height profiles, footprints and widths for seams of the bonded first replica structure as compared to seams of previous embosser drums, and d) a reduced number of metallic cylinder segments (e.g., such as the use of a single metallic cylinder) to form the embosser drum. The manufacturing methods disclosed herein may incorporate a metal plating process that can accommodate the use of large polymeric replicas, a drum forming technique to produce an accurate drum structure from a single flat metallic segment (e.g., stamper plate or shim) produced from the metal plating process instead of a plurality of segments (e.g., four segments as in existing embosser drum designs), and/or welding techniques to produce narrower welding seams with smoother weld surfaces and reduced seam height profiles on the embosser drum.

Generally, the manufacturing methods and processes disclosed herein may include the design and development of a new "embossing master" that is of an increased length as compared to those used in existing embosser drum manufacturing processes. For instance, the master may have a length equal to one-half of the circumferential length of the embosser drum embossing surface which may reduce the number of axial welding seams needed to form the final embossing surface. The master may also be designed to have a width less than that used in existing master designs (e.g., half the width of existing masters).

A number of "first generation" replicas (e.g., polymeric replicas) can be made from the embossing master and appropriately bonded together to create a flattened-out surface image of the embosser drum's embossing surface (a "bonded first replica structure"). For instance, in the event that a master is made having a length and width that are respectively twice and half that of existing masters, two of four first generation replicas can be bonded (e.g., welded) along their lengths, the other two of the four first generation replicas can be bonded along their lengths, and then the two pairs of replicas can be bonded along their widths. At this point, the bonded first generation replicas now form a bonded first replica structure (e.g., the flattened-out shape of the outer embossing surface of the embosser drum to be created). Alternatively, the four first generation replicas can be simultaneously bonded together to form the bonded first replica structure or bonded together in other manners.

The bonded first replica structure can then be used to create a single "second generation" polymeric replica which can then be metallized (e.g., electroformed) to generate a single thin metal stamper plate or shim (e.g., an "embossing plate") including the nanostructure patterns. The single metal stamper plate can then be rolled into a cylindrical formation and its ends welded together to form an embosser drum having a single seam with a reduced width and height profile as compared to the each of the four or more axial seams of previous embosser drum designs. As some embodiments envision that a plurality of second generation polymer replicas can be generated from the same bonded first replica structure (each of which can be used to create a single, one-piece metallic shim that can be shaped to form the entire outer surface of an embosser drum), the bonded first replica structure may in some embodiments essentially become a second or subsequent embossing master. In any case, any appropriate core may be inserted into the hollow center of the cylindrically-formed single metal stamper plate. For instance, a solid (e.g., cylindrical) rubber core may be compressed, inserted into the hollow center of the cylindrically-formed stamper plate, and allowed to expand to form a sturdy embosser drum.

Creation of the bonded first generation structure advantageously essentially replaces one or more of the axial seams of existing embosser drum manufacturing processes with circumferential seams that, once the embosser drum is ultimately formed, will have less negative impact on the pre-formatting process (e.g., on drive performance), the ability of an OPU to accurately read data of pre-formatted optical tape, and the like. Furthermore, the bonding of "first generation" polymeric replicas (to form a bonded first generation replica having a length and width the same or substantially the same as that of the final embosser drum outer surface) allows for seam width and height profiles that are reduced as compared to those results from the welding of the metal cylinder segments of previous embosser drum manufacturing methods. That is, reduced seam width and height profiles can be achieved when bonding flat polymeric segments together as compared to welding cylindrically-shaped metal segments together as in previous manufacturing methods. In any case, the disclosed manufacturing methods generate embosser drums that can more accurately pre-format optical tape due to the use of a reduced number of cylinder segments (e.g., the single thin metal stamper plate formed from the single second generation polymeric replica), one or more circumferential welded seams (i.e., as opposed to axial seams), reduced width and height profiles for seams, and/or a lower overall number of welding seams.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

DETAILED DESCRIPTION

Various embodiments herein include utilities directed to the manufacturing of embosser drums for use in pre-formatting optical media such as optical tape. The disclosed utilities generate embosser drums that are able to more accurately form or imprint a series of nano-structures (e.g., wobbled grooves) into the surface of the optical media due to a reduced number of seams (e.g., a single seam) compared to previous embosser drums, a reduced width and height profile of the single seam compared to those of each of the plurality of seams of previous embosser drums, and the like. As will be discussed, the reduced number of seams and seam width and height profiles result from the use of one or more circumferential seams (as opposed to axial seams) in one or more intermediate stages of the disclosed utilities in addition to bonding polymeric segments together into a first bonded replica structure during one or more intermediate steps (instead of welding metal cylinder segments together as part of a final step of an embosser drum manufacturing process).

Figure 1:
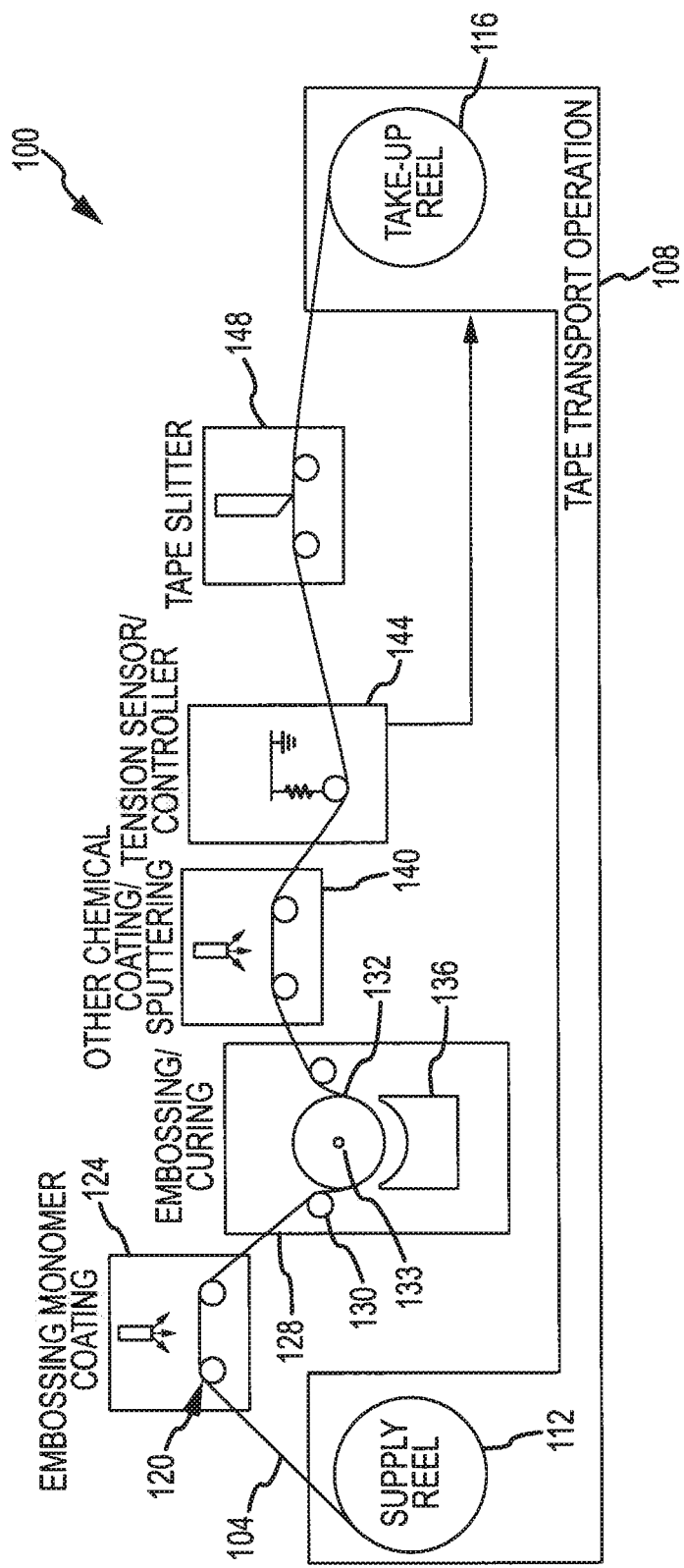
FIG. 1 is a schematic diagram of a Roll-to-Roll Nanoimprint Lithography process.

Turning now to FIG. 1, a schematic diagram of a system 100 is illustrated for use in pre-formatting optical media such as a length of optical tape 104 (e.g., to form a series or pattern of grooves into at least one of the first and second opposing surfaces of the optical tape 104). In one arrangement, the system 100 may implement a "Roll-to-Roll Nanoimprint Lithography" process including a number of operational stages or stations (each including any appropriate tool(s) and/or machinery) that systematically pre-format the optical tape 104 with nanometer-scale imprints such as a series or pattern of wobbled grooves (e.g., where each groove generally facilitates data tracking and the wobbled features of each groove generally facilitate data track addressing). As just one example for the purposes of context, each wobbled groove may have a depth of about 20 nanometers and a width of about 360 nanometers. OPUs can detect the various wobbled features as sine waves which can be decoded to obtain addressing information. In any event, while a number of operational stations will now be described, it should be understood that such stations may occur in an order different than that shown in FIG. 1 as appropriate, and also that additional or different stations may be utilized in the system 100 without departing from the scope of the present disclosure.

The system 100 may include any appropriate tape transport system 108 that is generally operable to move the optical tape 104 in first and/or second opposite longitudinal directions through the various operational stations. The tape transport system 108 may include at least one supply reel 112 for supplying optical tape 104 that needs to be pre-formatted (e.g., in the form of a polyester substrate or basefilm), at least one take-up reel 116 for receiving optical tape 104 that has been preformatted in the system 100, a number of rollers 120 for guiding the optical tape 104 through the various operational stations, and one or more drive motors (not shown) for inducing movement of the optical tape 104 in the first and/or second opposite longitudinal directions. Furthermore, and although not shown, the system 100 may include or be associated with any appropriate computing system including a processing unit (e.g., CPU), memory unit (e.g., RAM), and one or more programs including protocols or logic storable in the memory unit and executable by the processing unit for controlling operation of the system 100. The computing system may also include any appropriate I/O devices (e.g., keyboard, mouse, display, and the like).

One station of the system 100 may be an embossing monomer coating station 124 that is operable to coat a substrate or basefilm of the optical tape 104 with a layer of any appropriate liquid monomer into which a pattern of nanostructures may subsequently be formed. Once the optical tape 104 has left the embossing monomer coating station 124, the optical tape 104 may enter an embossing/curing station 128 that is generally operable to emboss nanostructure patterns into the liquid monomer layer and cure the liquid monomer layer to convert the liquid monomer layer into a solid polymer layer (e.g., an "embossed layer"). As shown, the embossing/curing station 128 includes an embosser drum 132 that rotates about an axis 133 and that has a nanostructure pattern on its outside surface (not shown in FIG. 1) for imprinting a nanostructure pattern of grooves into the liquid monomer layer. For instance, one of the rollers 120 may be a nip roller 130 that is operable to press the optical tape 104 against the nanostructure pattern on the outer surface of the embosser drum 132 to cause the imprint of the nanostructure pattern in the liquid monomer layer. Furthermore, the embossing/curing station 128 also includes a curing device 136 that emits UV light (or other type of light or heat) towards the optical tape 104 to cure the optical tape 104 and thus set the nanostructure pattern into the embossed layer of the optical tape 104.

The system 100 may include one or more additional chemical coating/sputtering stations 140 for use in creating or forming on the optical tape 104 a reflective layer (e.g., to reduce noise in reflected laser light read by OPUs), a phase change film, an overcoat, a topcoat, and/or the like as appropriate. Furthermore, the system 100 may include a tension sensor/ controller station 144 for use in maintaining appropriate tension in the optical tape 104 as the optical tape 104 moves through the system 100 and a tape slitting station 148 for use in longitudinally slitting or cutting the optical tape 104 into a plurality of narrower sections of optical tape 104. As mentioned above, more, fewer or different stations may be included in the system 100 without departing from the scope of the present disclosure. For instance, while the embossing and curing of the optical tape 104 have been shown as part of a common station, other embodiments envision that such steps could be part of separate stations.

Figure 2:
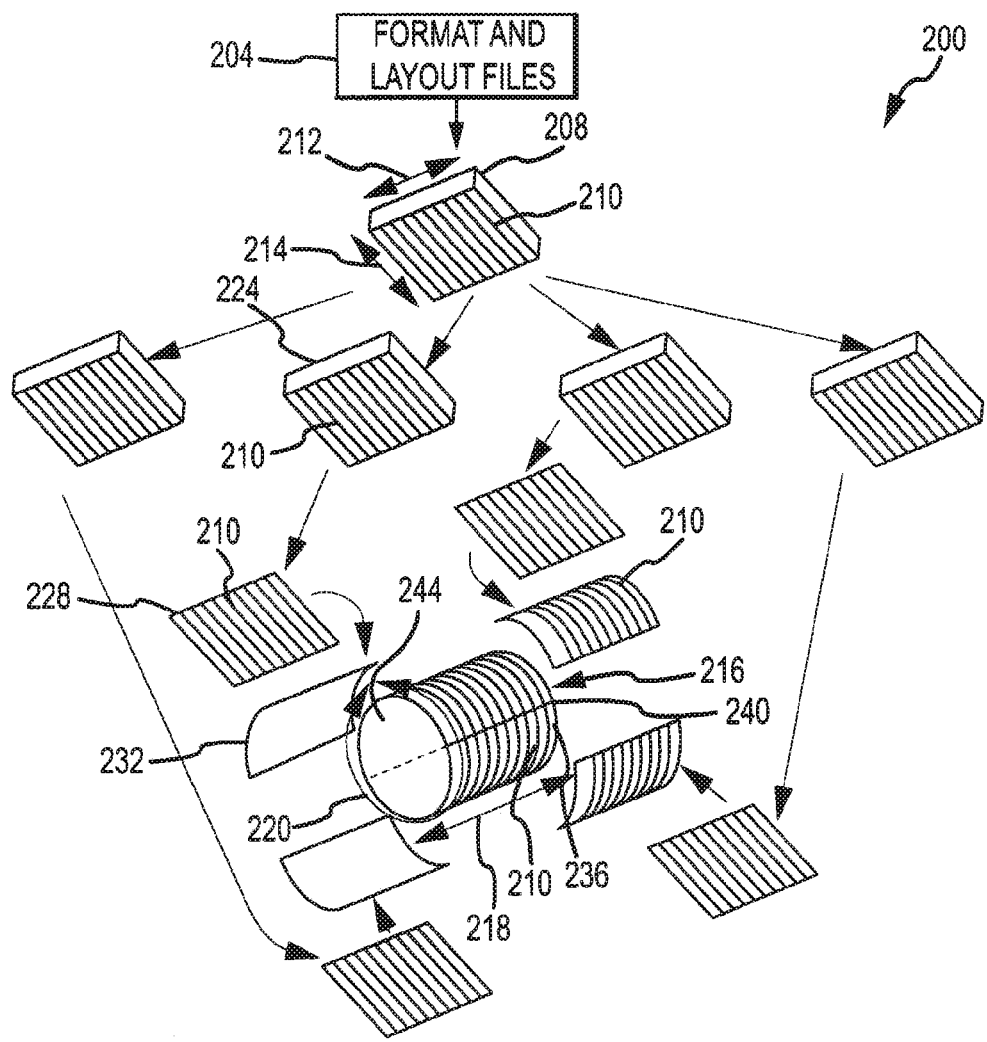
FIG. 2 is a schematic diagram of a process for manufacturing an embosser drum for use with the Roll-to-Roll Nanoimprint Lithography process of FIG. 1, according to the prior art.

Turning now to FIG. 2, a schematic flow diagram of a process 200 of manufacturing an embosser drum according to the prior art and usable in the embossing/curing station 128 of the system 100 of FIG. 1 is illustrated. Although not shown, the process 200 utilizes any appropriate tools, machines and the like to obtain the various components shown throughout the process 200. Furthermore, any appropriate computing system (with processor, memory, logic, and the like) may be in communication with the various tools and machines to drive construction of the embosser drum. The process 200 begins with the retrieval of one or more format or layout files 204 including the specific nanostructure pattern design to be formed on the outside surface of the embosser drum (for use in imprinting an opposite nanostructure pattern into the liquid monomer layer of the optical tape 104 of FIG. 1). The particular nanostructure pattern 210 is then formed (e.g., etched) on at least one surface of an embossing master 208 that is constructed of any appropriate material (e.g., quartz, silicon) and of any appropriate dimensions (e.g., approximately 5"×5"×½"). The embossing master 208 is typically constructed to have a width 212 that is approximately the same as an axial width 218 of the embosser drum 216 to be formed (e.g., 5 inches) and a length 214 that is approximately one-quarter of a circumference 220 of the as yet formed embosser drum 216 (e.g., 5 inches). In some arrangements, the width 212 and length 214 of the embossing master 208 may in actuality be slightly larger than the axial width 218 and one-quarter of the circumference 220 of the as yet formed embosser drum 216, respectively (e.g., on the order of fractions of an inch or even millimeters larger). In this regard, the outer surface of the embosser drum (e.g., four metallic shims 228, discussed more fully below) is more precisely cut or otherwise formed at a later step of the process 200.

From the embossing master 208, a number of polymer replicas 224 (e.g., rigid plastic replicas, only one of which has been labeled for clarity) are formed, where the number is selected as a function of the fraction of the circumference 220 represented by the length 214 of the embossing master 208. Stated differently, a particular number of polymer replicas 224 are made such that if such polymer replicas 224 were attached lengthwise in an end to end manner and subsequently wrapped around the outer surface of the yet to be formed embosser drum 216, the outer surface of the embosser drum 216 would be substantially fully covered. In this case, as the length 214 of the embossing master 208 is one-quarter of the circumference 220 of the yet to be formed embosser drum 216, four polymer replicas 224 are made. As the name implies, each polymer replica 224 is an exact or substantially exact replica (e.g., in terms of dimensions, surface features such as the nanostructure pattern 210, and the like) of the embossing master 208. In the interest of clarity, reference numeral 210 will be used to refer to the nanostructure pattern on all of the various components of the process 200.

After generation of the polymer replicas 224, a metallic stamper plate or shim 228 is formed from each of the polymer replicas 224 (e.g., via any metallizing process such as eletro-forming or electroplating), where each shim 228 includes the same length and width dimensions of its respective polymer replica 224 in addition to the nanostructure pattern 210 (all of which are the same as those of the embossing master 208). Each of the four shims 228 is then typically precisely cut (so that the four shims 228 when arranged in an end-to-end manner have a surface area substantially equal to those of the as yet formed embosser drum outer surface) and appropriately shaped (e.g., via one or more rollers) to form a cylindrical or cylinder segment 232 which will form a portion of the outer surface 236 of the embosser drum 216 to be formed. The cylinder segments 232 are then arranged end-to-end and welded together at four different seams 240 (only one of which has been labeled for clarity) to form the embosser drum 216. Each of the seams are typically in the range of 0.6 mm-0.8 mm such as about 0.7 mm.

As shown, the outer surface 236 of the embosser drum 216 includes the nanostructure pattern 210 whereby the individual structures (e.g., the grooves) of the nanostructure pattern 210 generally extend in a circumferential direction around the embosser drum 216. In this regard, and when used in the system 100 of FIG. 1, the embosser drum 216 may emboss or imprint the nanostructure pattern 210 into the liquid monomer layer of the optical tape 104 such that individual structures of the nanostructure pattern 210 extend along a length of the optical tape 104. For stability and while not shown, a compressible core (e.g., cylindrical portion of rubber) is typically compressed, inserted into a hollow interior 244 of the embosser drum and allowed to expand against inside surfaces of the cylinder segments 232 to form a substantially solid structure.

Figure 3:
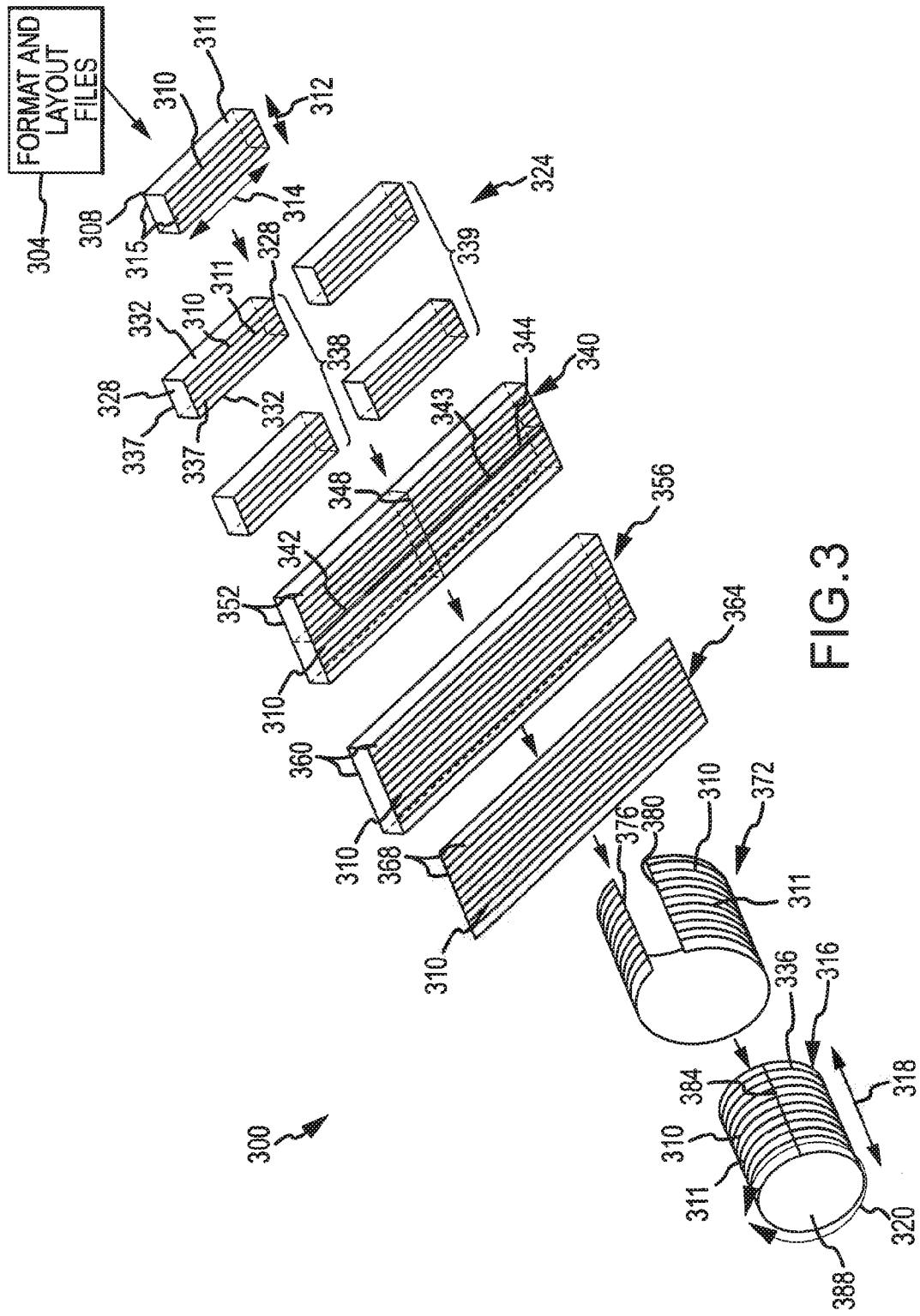
FIG. 3 is a schematic diagram of a process for manufacturing an embosser drum for use with the Roll-to-Roll Nanoimprint Lithography process of FIG. 1, according to one embodiment.

As discussed previously, the embosser drum 216 of the prior art suffers from a number of design flaws that lead to the inefficient and inaccurate pre-formatting of optical tape (e.g., the use of multiple metallic segments welded together at multiple axial seams to form the embosser drum's outer surface leading to misalignment of corresponding grooves or lands of adjacent segments, the use of multiple welding steps to connect adjacent segments resulting in an increased degree to which the final product of the embosser drum is at the mercy of each of the multiple welding steps, and the like). With reference now to FIG. 3, a schematic diagram of a process 300 is shown for manufacturing an embosser drum (e.g., usable with the system 100 of FIG. 1) that reduces the problems and inefficiencies associated with previous embosser drum designs and manufacturing methods (such as those associated with FIG. 2). Any appropriate computing system (with processor, memory, logic, and the like) may be in communication with one or more various tools and machines to drive construction of the embosser drum of FIG. 3. The process 300 of FIG. 3 will be discussed in conjunction with the method 400 illustrated in FIG. 4.

Figure 4:
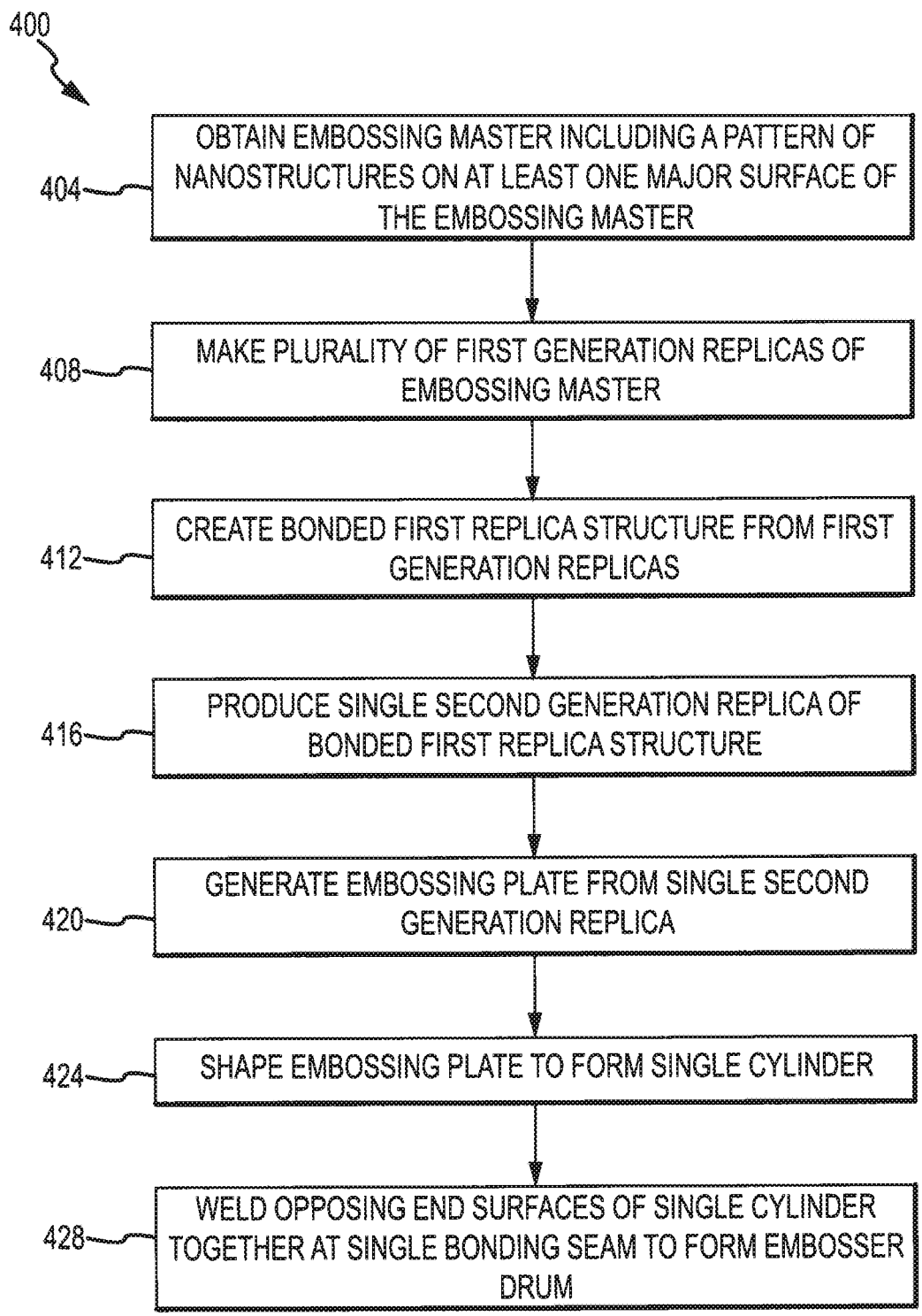
FIG. 4 is a flow diagram for use in manufacturing the embosser drum illustrated in FIG. 3.

As shown in FIG. 4, the method 400 may include obtaining 404 an embossing master including a pattern of nanostructures on at least one major surface of the embossing master. In one arrangement, the obtaining 404 may include, as shown in FIG. 3, retrieving of one or more format or layout files 304 including the specific nanostructure pattern 310 (e.g., including a series or set of grooves 311) to be formed on the outside surface 336 (e.g., outer embossing surface) of the embosser drum 316 to be formed (which may be the same as the nanostructure pattern 210 of FIG. 2). For instance, an operator may appropriately select and load a layout file 304 into an associated computing system corresponding to a desired wobbled groove pattern to be formed on the embosser drum, and the computing system may coordinate with the various machines and tools to construct an embosser drum having a corresponding wobbled groove pattern. Thereafter, the nanostructure pattern 310 may be etched into at least one of opposing major surfaces 315 of an embossing master 308 formed of any appropriate material (e.g., silicon).

Unlike previous embossing masters (e.g., the embossing master 208 of FIG. 2), the embossing master 308 of FIG. 3 may be constructed or otherwise selected to have a width 312 that is less than an axial width 318 of the embosser drum 316 to be formed and/or a length 314 that is a greater fraction of a circumference 320 of the yet to be formed embosser drum 316 than are previous embossing master lengths for reasons that will become more apparent in the ensuing discussion. For instance, the width 312 of the embossing master 310 may be half of the axial width 318 of the as yet formed embosser drum 316 and the length 314 of the embossing master 310 may be half of the circumference 320 of the as yet formed embosser drum 316, resulting in the embossing master 308 having dimensions of approximately 2½"×10"×½"). Other dimensions of the embossing master 308 are also contemplated and encompassed within the scope of the present disclosure. In some arrangements, the width 312 and length 314 of the embossing master 308 may in actuality be slightly larger than half the axial width 318 and half the circumference 320 of the as yet formed embosser drum 316, respectively (e.g., on the order of fractions of an inch or even millimeters larger). In this regard, the outer surface of the embosser drum (e.g., a single metallic shim 364, discussed more fully below) is more precisely cut or otherwise formed at a later step of the process 300 and/or method 400.

In any case, the method 400 may include making 408 a plurality of first generation polymer replicas 324 from the embossing master 308. As the name implies, each first generation polymer replica may be an exact or substantially exact replica (e.g., in terms of dimensions, surface features such as the nanostructure pattern 310, and the like) of the embossing master 308. As shown, each polymer replica 324 may include a pair of generally opposing end surfaces 328, a pair of generally opposing side surfaces 332, and a pair of generally opposing top and bottom or "major" surfaces 337. At least a first of the major surfaces 337 of each of the polymer replicas 324 includes the nanostructure pattern 310. The particular number of polymer replicas 324 may be such that, when the surface areas of the first major surfaces 337 including the nanostructure patterns 310 of such particular number of replicas 324 are summed, a value substantially equal to (e.g., slightly larger than) a surface area of an outer surface 336 of the yet to be formed embosser drum 316 results. In the illustration of FIG. 3, four first generation polymer replicas 324 may be generated and used to eventually form the embosser drum 316.

Once the first generation polymer replicas 324 have been generated, the first generation polymer replicas 324 may be bonded together to create 412 a bonded first replica structure 340 having opposing major surfaces 352. Each opposing major surface 352 has a surface that is at least substantially the same as (e.g., slightly larger than) that of the outer surface 336 of the yet to be formed embosser drum 316. Furthermore, the first generation polymer replicas 324 are bonded together to form the bonded first replica structure 340 in a manner that utilizes at least one longitudinal seam (i.e., a seam that runs generally parallel to the longitudinal direction of the grooves 311 of the nanostructure pattern 310). Advantageously, a structure is formed (i.e., the bonded first replica structure 340) having a first major surface 352 with the nanostructure pattern 310 formed therein and having a reduced number or length of axial seams (i.e., seams that run generally perpendicular to a longitudinal direction of the grooves 311 of the nanostructure pattern 310) compared to previous embosser drums. For instance, the number or length of axial seams of the bonded first replica structure 340 is less than that of the embosser drum 216 (which, as seen in FIG. 2, includes four axial seams, or three axial seams if flattened out, but no longitudinal/circumferential seams).

As will be discussed later on this discussion, the bonded first replica structure 340 can be used to form at least one single "second generation" polymer replica 356 that is at least substantially or fully devoid of any seams and which can be used to produce a single metallic shim 364. Each single metallic shim 364 can be appropriately shaped and welded along a single axial seam 384 (as opposed to the plurality of axial seams 240 of the prior art embosser drum 216) to form a respective embosser drum 316. Reducing the number of axial seams used in the manufacturing processing of an embosser drum as shown in the process 300 of FIG. 3 advantageously reduces at least some of the inefficiencies and other problems associated with the prior art embosser drum 216 and its associated manufacturing method (e.g., by limiting the degree to which an OPU must traverse axial seams while reading a portion of optical tape). Furthermore, bonding the first generation replicas 324 together instead of welding such replicas 324 together (as are the four cylinder segments 232 of the prior art embosser drum 216) advantageously allows for a more accurate and precise alignment and connection of adjacent first generation polymer replicas 324 as well as reduced seam widths (e.g., on the order of 0.20 mm-0.30 mm) (e.g., due to the fact that welding results in melted metal solidifying within the seams, among other reasons).

For instance, opposing side surfaces 332 of first and second polymer replicas 324 (e.g., forming a first pair 338) may be bonded together at a longitudinal seam 342, opposing side surfaces of third and fourth polymer replicas 324 (e.g., forming a second pair 339) may be bonded together at a longitudinal seam 343 that is generally collinear with the longitudinal seam 342, and then opposing end surfaces 328 of the first and second pairs 338, 339 may be bonded together such that the bonded first replica structure 340 includes a longitudinal seam 344 (collectively including the longitudinal seams 342, 343) and an axial seam 348 that is at least substantially perpendicular to the longitudinal seam 344. In one arrangement, the first generation polymer replicas 324 may be bonded together as discussed above at least substantially simultaneously. For instance, the first generation polymer replicas 324 may be arranged on a surface (e.g., a glass surface) with the "active" surfaces (e.g., those including the nanostructure patterns 310) facing away from the surface and then bonded together as discussed above. In another arrangement, the first pair 338 may be bonded together and the second pair 339 may be bonded together, and then the first and second pairs 338, 339 may be bonded together along their end surfaces 328 at axial seam 348 (which includes respective axial seams between adjacent polymer replicas 324). In further arrangements, the bonded first replica structure 340 may include only first and second polymer replicas 324 bonded at their respective side surfaces along a longitudinal seam (each having a length the same as the circumference 320 of the embosser drum 316 to be formed) or more than four polymer replicas 324. In any case, the bonded first replica structure 340 may include opposing major surfaces 352, at least a first of which includes the nanostructure pattern 310 formed therein.

From the first bonded replica structure 340, a single "second generation" polymer replica 356 may be produced 416 including opposing major surfaces 360, at least a first of which includes the nanostructure pattern 310 formed therein. As shown, the second generation polymer replica 356 may be devoid of any seams and may thus constitute a single, integral, one-piece structure where a surface area of each of the opposing major surfaces 360 is at least substantially the same as (e.g., slightly larger than) that of the outer surface 336 of the yet to be formed embosser drum. From the single second generation polymer replica 356, a single metallic (e.g., nickel) stamper plate or shim 364 may be generated 420 (e.g., via any metallizing process such as eletroforming or electroplating). Like the bonded first replica structure 340 and the second generation bonded replica 356, the metallic shim 364 includes opposing major surfaces 368, at least one of which includes the nanostructure pattern 310 therein.

The single metallic shim 364 may then be appropriately shaped 424 (e.g., via one or more rollers) to form a single "substantial" cylinder 372 which will form the entire outer surface 336 of the embosser drum 316 to be formed. In some arrangements, the single metallic shim 364 may first be cut (e.g., laser cut) to the precise or substantially precise dimensions of the as yet formed embosser drum 316 before being shaped into the substantial cylinder 372. In any event, first and second end surfaces 376, 380 of the single cylinder segment 372 may be appropriately welded 428 along a single seam 384 (e.g., by aligning corresponding grooves adjacent the first and second end surfaces 376, 380 in both radial and lateral directions, limiting a width of the single seam 384, reducing weld spatter, and the like) to form the embosser drum 316. For stability and while not shown, a compressible core (e.g., cylindrical portion of rubber) may be compressed, inserted into a hollow interior 388 of the embosser drum and allowed to expand against a second major surface 368 of the cylinder 372 (opposite the first major surface 368 including the nanostructure pattern 310) to form a substantially solid structure. It is noted that the single cylinder 372 has been referred to as a single "substantial" cylinder 372 to connote that the first and second end surfaces 376, 380 have not yet been welded together. Furthermore, it should be understood that the single substantial cylinder 372 is the same physical piece of material as the single metallic shim 364. Thus, the opposing major surfaces 368, first and second end surfaces 376, 380 and the like are common between the single metallic shim 364 and the single substantial cylinder 372.

The process 300 and method 400 of FIGS. 3 and 4 for manufacturing the embosser drum 316 present numerous advantages over previous embosser drum manufacturing processes and methods (e.g., such as that of FIG. 2). As discussed previously, the dimensions of the embossing master 308 (e.g., the length 314 and width 312) are selected so that the first generation polymer replicas 324 can be bonded together in a manner that utilizes at least one or more longitudinal seams between adjacent first generation polymer replicas 324 (i.e., seams that are generally parallel to a longitudinal direction of grooves 311 of the nanostructure pattern 310 of the first generation polymer replicas 324) to form a first polymer replica structure 340 having a first major surface 352 including the nanostructure pattern 310 and a surface area substantially the same as that of the outer surface 336 of the yet to be formed embosser drum 316. Advantageously, a structure is formed (i.e., the bonded first replica structure 340) having a first major surface 352 with the nanostructure pattern 310 formed therein and having a reduced number or length of axial seams and a corresponding reduction in the inefficiencies that are associated with axial seams as compared to prior art embosser drums and manufacturing methods therefore. Additionally, any longitudinal bonding marks in the bonded first replica structure 340 that are passed on to the second generation polymer replica 356 and ultimately to the outer surface 336 of the embosser drum 316 will have less impact on OPUs and subsequent signal processing because the OPUs need not necessarily traverse longitudinally oriented marks as they do with axially oriented marks.

Furthermore, bonding the first generation replicas 324 together instead of welding such replicas 324 together (as are the four cylinder segments 232 of the prior art embosser drum 216) advantageously allows for a more accurate and precise alignment and connection of adjacent first generation polymer replicas 324 as well as reduced seam widths (e.g., on the order of 0.20 mm-0.30 mm). Still further, in embodiments where a plurality of second generation replicas are formed from the same bonded first replica structure 340 (each being devoid of seams and each having at least one major surface 360 with the nanostructure pattern 310 therein and a surface area substantially the same as that of the outer surface 336 of the embosser drum 316 to be formed), the bonded first replica structure 340 can essentially become a second or subsequent "embossing master". Each single second generation replica 356 can metalized to form a single metallic shim 364 which can be cut and/or shaped into a substantial cylinder 372 and welded at a single axial seam 384 along first and second end surfaces 376, 380 to form an embosser drum 316 having a single axial seam 384 as opposed to the plurality of axial seams 240 of the prior art embosser drum 216.

While this specification contains many specifics, these should not be construed as limitations on the scope of the disclosure or of what may be claimed, but rather as descriptions of features specific to particular embodiments of the disclosure. Furthermore, numerous other arrangements are envisioned. For instance, while the embossing master 308 and thus each of the first generation polymer replicas 324 have been illustrated as being generally rectangular (e.g., having generally opposing and parallel side and end surfaces 332, 328), the present disclosure is not so limited. In some arrangements, an embossing master 308 may be generated having non-parallel end surfaces. For instance, one of the end surfaces may form a first non-normal angle (e.g.,) 45° with a first of the side surfaces and a second non-normal angle (e.g.,) 135° with a second of the side surfaces. In this regard, the embossing master 308 and thus each of the first generation polymer replicas 324 may resemble a trapezoid. For instance, the end surfaces 328 of adjacent first generation polymer replicas 324 may be asymmetrically interconnected to create a bonding seam that forms a non-normal angle with the longitudinal seam 344 (e.g., 45° or 135'). This arrangement may further reduce the use of perfectly axial bonding seams (i.e., those that extend at least substantially perpendicularly to the grooves of the nanostructure pattern 310) and the associated inefficiencies. In another arrangement, the embossing master 308 and first generation polymer replicas 324 may be appropriate shaped to result in the single bonding seam 384 of the embossing drum 316 being other than substantially perpendicular to the grooves of the nanostructure pattern 310.

In another embodiment, the teachings herein may be utilized to create more than a single embossing plate/metallic shim (but fewer than the four or more used in previous embosser drum designs) which may be appropriately welded or bonded together to form an embosser drum still having a reduced number and/or length of axial seams. For example, embossing master replicas may be bonded together to create a bonded first replica structure having opposing major surfaces, each of which has a surface area equal to half that of the embosser drum to be formed. In this regard, two second generation replicas may be formed from the bonded first replica structure and then welded together at two seams to form the embosser drum. Other manners of forming embosser drums with fewer seams than previous embosser drums are also envisioned.

Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. A method for use in fabricating an embosser drum, comprising: making a plurality of replicas of an embossing master, wherein each of the replicas includes a pattern of nanostructure, wherein a width of the embossing master is approximately half an axial width of the embosser drum to be formed, and wherein a length of the embossing master is approximately half of a circumference of the embosser drum to be formed; bonding the plurality of replicas of the embossing master together in a particular orientation to create a bonded replica structure including a surface having a pattern of nanostructures thereon, wherein the pattern of nanostructures on the surface of the bonded replica structure comprises the combination of the patterns of nanostructures of the plurality of replicas of the embossing master; producing a replica of the bonded replica structure; and generating an embossing plate from the replica of the bonded replica structure.

2. The method of claim 1, wherein the embossing plate includes a pair of opposing end surfaces and a pair of opposing major surfaces, wherein the embossing plate includes the pattern of nanostructures on a first of the opposing major surfaces, and wherein the method further comprises:
welding the opposing end surfaces of the embossing plate together at a single seam to form an embosser drum, wherein an outer embossing surface of the embosser drum comprises the first major opposing surface of the embossing plate.

3. The method of claim 1, wherein each of the replicas of the embossing master includes a pair of opposing end surfaces and a pair of opposing side surfaces, wherein a length of the side surfaces is greater than a length of the end surfaces, and wherein the bonding comprises:
bonding first and second of the replicas of the embossing master together along respective side surfaces at a first bonding seam.

4. The method of claim 3, wherein each of the replicas of the embossing master comprises a pair of opposing major surfaces, wherein a first of the major surfaces includes the pattern of nanostructures, wherein the pattern of nanostructures comprises a set of generally parallel grooves, and wherein the first bonding seam extends generally parallel to the set of generally parallel grooves.

5. The method of claim 4, wherein the bonded replica structure comprises a pair of opposing major surfaces, wherein a first of the major surfaces includes the pattern of nanostructures, and wherein the first of the major surfaces comprises a surface area that is at least substantially the same as an outer embossing surface of the embosser drum.

6. The method of claim 3, wherein the bonding further comprises:
bonding third and fourth of the replicas of the embossing master together along respective side surfaces at a second bonding seam; and
bonding the first and second embossing master replicas to the third and fourth embossing master replicas along respective end surfaces at a third bonding seam, wherein the first and second bonding seams are at least substantially collinear, and wherein the first and second bonding seams are at least substantially perpendicular to the third bonding seam.

7. The method of claim 6, wherein the bonding steps occur at least substantially simultaneously.

8. A method for producing at least one embosser drum that has a pattern of nanometer-scale grooves formed in an outer surface thereof, the method comprising:
producing a plurality of replicas of an embossing master that has at least one surface with the pattern of nanometer-scale grooves therein, wherein each of the replicas of the embossing master comprises at least one surface with the pattern of nanometer-scale grooves therein;
bonding the plurality of replicas of the embossing master together to create a bonded replica structure having at least one surface with the pattern of nanometer-scale grooves formed therein, wherein the bonded replica structure comprises at least one bonding seam between adjacent ones of the replicas of the embossing master that extends generally parallel to the nanometer-scale grooves, and wherein a surface area of the at least one surface of the bonded replica structure is at least substantially the same as a surface area of the outer surface of the embosser drum to be formed; producing a replica of the bonded replica structure; and using the replica of the bonded replica structure to create the embosser drum, wherein the using further comprises: performing a metallizing process on the at least one surface of the replica of the bonded replica structure to create a metallic shim, wherein the metallic shim comprises the pattern of nanometer-scale grooves on at least one surface thereof; and shaping the metallic shim to form the outer surface of the embosser drum.

9. The method of claim 8, wherein the shaping comprises: welding opposing end surfaces of the metallic shim together to form the embosser drum, wherein the embosser drum comprises only a single seam.

10. The method of claim 9, wherein the single seam of the embosser drum extends generally perpendicularly to the nanometer-scale grooves.

11. The method of claim 8, further comprising: producing another replica of the bonded replica structure; performing a metallizing process on at least one surface of the another replica to create another metallic shim, wherein the another metallic shim comprises the pattern of nanometer-scale grooves on at least one surface thereof; and shaping the another metallic shim to form an outer surface of another embosser drum.

12. The method of claim 8, wherein the embossing master comprises silicon and the replicas of the embossing master comprise a polymer.

13. The method of claim 1, wherein the generating comprises: performing a metallizing process on the replica of the bonded replica structure to create the embossing plate, wherein the embossing plate comprises the pattern of nanostructures on at least one surface thereof.

14. A method for use in fabricating an embosser drum, comprising:
  making a plurality of replicas of an embossing master, wherein each of the replicas includes a pattern of nanostructures, a pair of opposing end surfaces, and a pair of opposing side surfaces, and wherein a length of the side surfaces is greater than a length of the end surfaces;
  bonding the plurality of replicas of the embossing master together in a particular orientation to create a bonded replica structure including a surface having a pattern of nanostructures thereon, wherein the pattern of nanostructures on the surface of the bonded replica structure comprises the combination of the patterns of nanostructures of the plurality of replicas, and wherein the bonding includes:
  bonding first and second of the replicas of the embossing master together along respective side surfaces at a first bonding seam;
  bonding third and fourth of the replicas of the embossing master together along respective side surfaces at a second bonding seam; and bonding the first and second embossing master replicas to the third and fourth master replicas along respective end surfaces at a third bonding seam, wherein the first and second bonding seams are at least substantially collinear, and wherein the first and second bonding seams are at least substantially perpendicular to the third bonding seam.

15. The method of claim 14, further comprising:
producing a replica of the bonded replica structure.

16. The method of claim 14, wherein the bonding steps occur at least substantially simultaneously.

\* \* \* \* \*

UNITED STATES PATENT AND TRADEMARK OFFICE
CERTIFICATE OF CORRECTION

PATENT NO. : 8,790,561 B2  Page 1 of 1
APPLICATION NO. : 13/184844
DATED : July 29, 2014
INVENTOR(S) : Mahnad et al.

It is certified that error appears in the above-identified patent and that said Letters Patent is hereby corrected as shown below:

In the Specification

In column 1, lines 28-29, delete "semi transparent" and insert -- semitransparent --, therefor.

In column 2, line 51, after "the" delete "a".

In column 5, line 12, delete "singular" and insert -- singular. --, therefor.

In columns 7-8, line 67, delete "eletroforming" and insert -- electroforming --, therefor.

In column 11, line 8, delete "eletroforming" and insert -- electroforming --, therefor.

In column 12, line 39, delete "(e.g.,) 45°'" and insert -- (e.g., 45°) --, therefor.

In column 12, lines 40-41, delete "(e.g.,) 135°'" and insert -- (e.g., 135°) --, therefor.

In column 12, line 47, delete "135')." and insert -- 135°). --, therefor.

Signed and Sealed this
Third Day of March, 2015

Michelle K. Lee
*Deputy Director of the United States Patent and Trademark Office*